United States Patent
Hsu

(10) Patent No.: US 8,844,825 B2
(45) Date of Patent: Sep. 30, 2014

(54) SYSTEM AND METHOD FOR TESTING MAGNETIC STRIPE DECODING CHIP

(71) Applicant: Uniform Industrial Corp., New Taipei (TW)

(72) Inventor: Tung-Jung Hsu, New Taipei (TW)

(73) Assignee: Uniform Industrial Corp., New Taipei (TW)

( * ) Notice: Subject to any disclaimer, the term of this patent is extended or adjusted under 35 U.S.C. 154(b) by 35 days.

(21) Appl. No.: 13/683,204

(22) Filed: Nov. 21, 2012

(65) Prior Publication Data

US 2013/0126613 A1    May 23, 2013

(30) Foreign Application Priority Data

Nov. 23, 2011   (TW) .............................. 100142937 A

(51) Int. Cl.

| | |
|---|---|
| *G06K 13/00* | (2006.01) |
| *G06K 13/24* | (2006.01) |
| *G06F 17/00* | (2006.01) |
| *G06K 7/00* | (2006.01) |
| *G06K 7/08* | (2006.01) |
| *G06K 19/00* | (2006.01) |
| *G06K 19/06* | (2006.01) |

(52) U.S. Cl.
CPC .................................. *G06K 7/0095* (2013.01)
USPC ........... 235/483; 235/375; 235/439; 235/449; 235/487; 235/493; 235/435

(58) Field of Classification Search
USPC .................. 235/483, 487, 492, 439, 449, 375
See application file for complete search history.

(56) References Cited

U.S. PATENT DOCUMENTS

| | | | | | |
|---|---|---|---|---|---|
| 3,795,805 | A | * | 3/1974 | Swanberg et al. ............ | 250/226 |
| 3,873,813 | A | * | 3/1975 | Lahr et al. ..................... | 235/380 |
| 4,527,051 | A | * | 7/1985 | Stenzel ......................... | 235/380 |
| 4,841,389 | A | * | 6/1989 | Hoyt et al. ...................... | 360/75 |
| 4,926,031 | A | * | 5/1990 | Stenzel ......................... | 235/380 |
| 5,162,728 | A | * | 11/1992 | Huppenthal ............. | 324/756.03 |
| 5,679,942 | A | * | 10/1997 | Toyama ........................ | 235/449 |
| 6,176,424 | B1 | * | 1/2001 | Meyer-Wittreck et al. ... | 235/381 |
| 6,719,199 | B1 | * | 4/2004 | Cotten et al. ................... | 235/380 |
| 7,866,556 | B2 | * | 1/2011 | Pedigo et al. ................. | 235/449 |
| 8,584,956 | B2 | * | 11/2013 | Wilson et al. ................. | 235/492 |
| 8,727,215 | B2 | * | 5/2014 | Hsu ............................... | 235/438 |
| 2007/0080205 | A1 | * | 4/2007 | You et al. ...................... | 235/375 |
| 2008/0110987 | A1 | * | 5/2008 | Cato et al. ..................... | 235/437 |
| 2008/0174315 | A1 | * | 7/2008 | Top et al. ...................... | 324/457 |
| 2008/0244143 | A1 | * | 10/2008 | Chiou et al. .................. | 710/302 |

(Continued)

*Primary Examiner* — Daniel Walsh
(74) *Attorney, Agent, or Firm* — Muncy, Geissler, Olds & Lowe, P.C.

(57) ABSTRACT

A system and a method for testing a magnetic stripe decoding chip are provided. The system includes a host, a digital-to-analog converter, and a testing device. The host outputs simulation signal data. The digital-to-analog converter receives the simulation signal data and generates a test waveform signal representing a test string. The testing device includes a signal input terminal, a signal conversion circuit, a chip slot, and a processor. The terminal receives the test waveform signal. The chip slot is configured to receive a decoding chip. The circuit includes a transformer connected between the terminal and the chip slot, and is configured to couple the test waveform signal into a pseudo track signal. The processor receives a decoded string generated after decoding the pseudo track signal by the decoding chip. Through comparing the decoded string with the test string, a decoding function of the decoding chip can be determined.

8 Claims, 6 Drawing Sheets

(56) References Cited

U.S. PATENT DOCUMENTS

| | | | |
|---|---|---|---|
| 2009/0078764 A1* | 3/2009 | Pedigo et al. | 235/449 |
| 2009/0204356 A1* | 8/2009 | Kotani et al. | 702/108 |
| 2010/0065637 A1* | 3/2010 | Top et al. | 235/438 |
| 2010/0230487 A1* | 9/2010 | Johnson et al. | 235/380 |
| 2010/0230494 A1* | 9/2010 | Okui | 235/449 |
| 2011/0213564 A1* | 9/2011 | Henke | 702/23 |
| 2011/0266346 A1* | 11/2011 | Ohta et al. | 235/449 |
| 2011/0309913 A1* | 12/2011 | Peters et al. | 340/10.1 |
| 2013/0122825 A1* | 5/2013 | Deforge et al. | 455/73 |
| 2013/0126613 A1* | 5/2013 | Hsu | 235/438 |
| 2013/0332102 A1* | 12/2013 | Chiang | 702/122 |

\* cited by examiner

SYSTEM AND METHOD FOR TESTING MAGNETIC STRIPE DECODING CHIP

CROSS-REFERENCES TO RELATED APPLICATIONS

This non-provisional application claims priority under 35 U.S.C. §119(a) on Patent Application No. 100142937 filed in Taiwan, R.O.C. on 2011 Nov. 23, the entire contents of which are hereby incorporated by reference.

BACKGROUND OF THE INVENTION

1. Technical Field

The present invention relates to a system and a method for testing a chip, and more particularly to a system and a method for testing a magnetic stripe decoding chip.

2. Related Art

FIG. 1 is a diagram of a relation between a magnetic stripe and a decoding signal in the prior art. Generally, a magnetic stripe 101a in a debit or credit card is configured with specifically encoded binary data corresponding to the distribution of magnetic poles on the magnetic stripe. The magnetic stripe may record information by using an encoding technique such as frequency modulation (FM), phase modulation (PM) or double-frequency coherent-phase (F/2F, also known as Aiken Biphase). FIG. 1 shows an example of magnetic pole distribution when the double-frequency coherent-phase encoding technique (F/2F, also known as Aiken Biphase), is used for encoding. A corresponding magnetic code signal 102a can be generated by sensing the magnetic pole distribution (including a plurality of north magnetic poles N and a plurality of south magnetic poles S), of the magnetic stripe 101a.

As shown in FIG. 1, an F/2F encoded signal 103a is a clock signal with alternating high and low levels, and is defined as 0 or 1 according to the duration of high and low levels. Consequently, the F/2F encoded signal 103a may be decoded into a binary data sequence 104a according to peak-to-peak periods T of the magnetic code signal 102a.

FIG. 2 is a schematic view of a magnetic stripe reading circuit 110a in the prior art. As shown in FIG. 2, a magnetic head 111a can sense movement of a magnetic stripe in a magnetic card, and generate the magnetic code signal 102a shown in FIG. 1. A signal processing circuit 112a converts the magnetic code signal 102a into an F/2F encoded signal 113a. A decoding chip 114a receives the F/2F encoded signal 113a, and decodes the signal into the binary data sequence 104a shown in FIG. 1.

As shown in FIG. 2, a differential amplifier is disposed at a front end of the signal processing circuit 112a, and configured to receive and amplify a differential signal (the magnetic code signal 102a), output by the magnetic head 111a, so that a comparator at the back end uses a level voltage Vbias as a reference to detect a waveform and capture wave peaks, and further converts the differential signal into the F/2F encoded signal 113a.

However, before shipment the manufacturer of the decoding chip 114a is required to inspect the quality of the decoding chip 114a. In an existing testing method, the architecture of the magnetic stripe reading circuit 110a is adopted as a testing circuit, and the decoding chip 114a is tested by means of manual swiping, so as to judge whether the decoding chip 114a can correctly read information recorded by the magnetic stripe.

However, such a testing method incurs the following problems:

1. To test the reliability of the decoding chip 114a, the decoding chip 114a is required to be tested for many times with different swipe speeds and swipe directions, which is labor and time consuming.

2. The swipe speed cannot be accurately controlled manually, which easily leads to inconsistency between test conditions and practical operations, resulting in an incomplete test item.

SUMMARY

Accordingly, the present invention is directed to a system and a method for testing a magnetic stripe decoding chip, so as to solve the problems in the prior art.

In an embodiment, the present invention provides a system for testing a magnetic stripe decoding chip, including a host, a digital-to-analog converter, and a testing device.

The digital-to-analog converter is connected electrically to the host. The testing device is connected electrically between the host and the digital-to-analog converter.

The host is configured to output simulation signal data. The digital-to-analog converter is configured to receive the simulation signal data and output a test waveform signal representing a test string. The testing device includes a signal input terminal, a signal conversion circuit, a chip slot, and a processor which are connected electrically in sequence.

The signal input terminal is configured to receive the test waveform signal. The chip slot is configured to receive a decoding chip. The signal conversion circuit includes at least one transformer. A primary side of each transformer is connected electrically to the signal input terminal. A secondary side of each transformer is connected electrically to the chip slot. Each transformer is configured to convert the test waveform signal into a pseudo track signal. The processor is configured to receive at least one decoded string respectively generated after decoding the at least one pseudo track signal by the decoding chip, whereby one of the host and the processor compares the decoded string with the test string, so as to judge a decoding function of the decoding chip.

In an embodiment, the present invention provides a method for testing a magnetic stripe decoding chip, including: selecting simulation signal data from a database according to a test item; generating a test waveform signal representing a test string by using the simulation signal data; coupling the test waveform signal into a pseudo track signal by using a transformer; outputting the pseudo track signal to a track signal receiver of a decoding chip; receiving a decoded string generated after decoding the pseudo track signal by the decoding chip; comparing the decoded string with the test string; and judging whether other test items exist, and if other test items exist, continuing the step of selecting simulation signal data from a database according to a test item; and if no other test items exist, outputting a test result.

In the embodiments of the present invention, a test waveform is directly provided for the decoding chip, which can reduce the testing time, and the test waveform may be customized to provide a comprehensive test, thereby improving the efficiency of inspection of decoding chips, and reducing the labor cost.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 3:
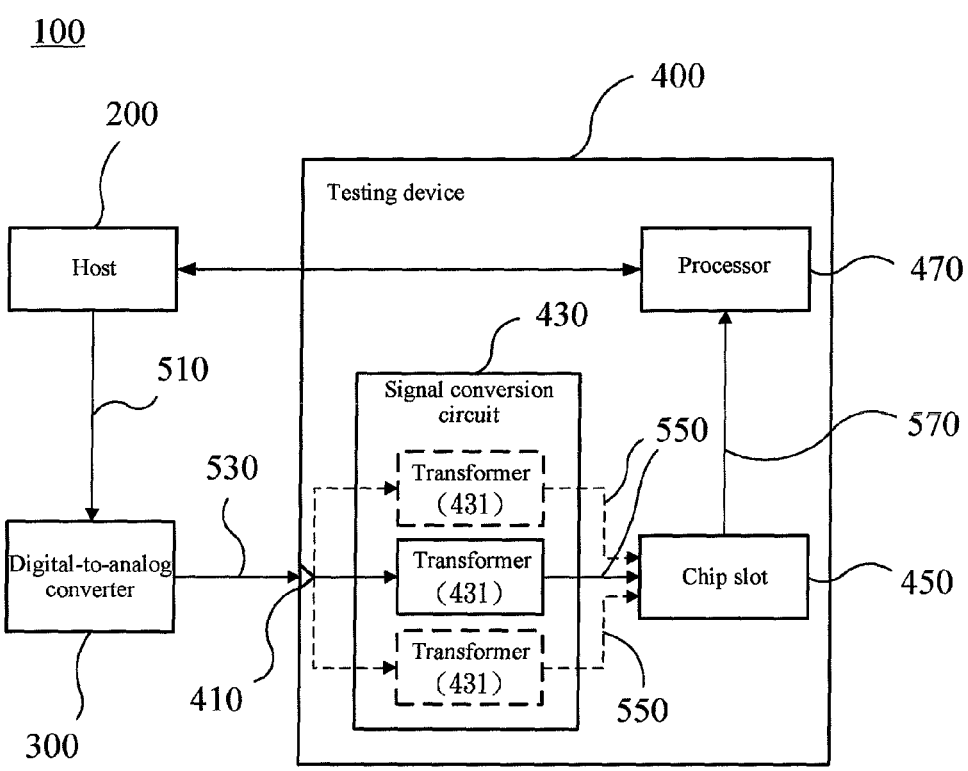
FIG. 3 is a block diagram of a testing system according to an embodiment of the present invention.

FIG. 3 is a block diagram of a testing system 100 according to an embodiment of the present invention. As shown in FIG. 3, the testing system 100 includes a host 200, a digital-to-analog converter 300, and a testing device 400. The testing system 100 is configured to test whether a magnetic stripe decoding chip (briefly referred to as a decoding chip below), is normal, that is, test whether the decoding chip can correctly read an encoded signal of a magnetic stripe.

The digital-to-analog converter 300 is connected electrically to the host 200. The testing device 400 is connected electrically between the host 200 and the digital-to-analog converter 300. Here, the digital-to-analog converter 300 may be a function generator, and the host 200 may be a computer, such as a desktop computer or a notebook computer.

In an embodiment, the host 200 may be connected to the digital-to-analog converter 300 through a universal serial bus (USB) transmission line. The host 200 may be connected to the testing device 400 through an RS232 transmission line. The digital-to-analog converter 300 may be connected to the testing device 400 through a coaxial signal line.

Figure 1:
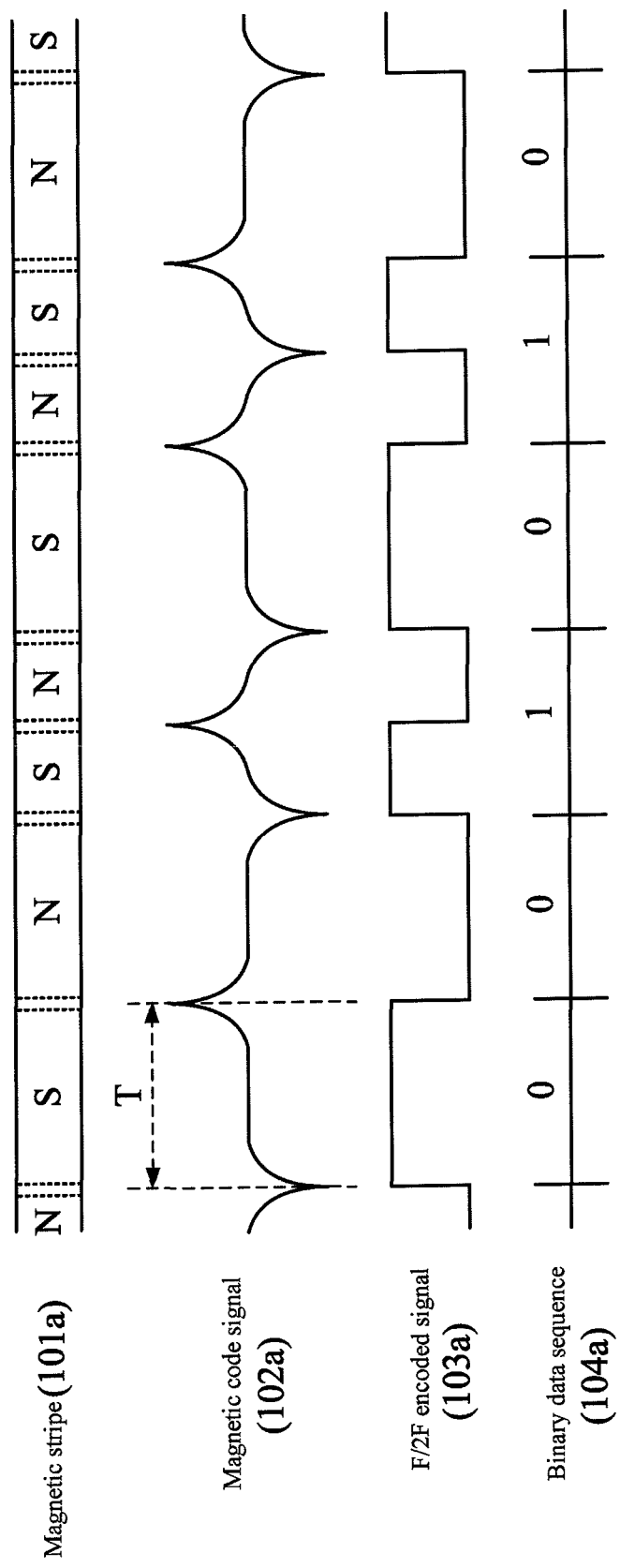
FIG. 1 is a diagram of a relation between a magnetic stripe and a decoding signal in the prior art.

The host 200 is configured to output simulation signal data 510. The digital-to-analog converter 300 receives the simulation signal data 510, and outputs a test waveform signal 530 (such as a magnetic code signal 102a shown in FIG. 1), representing a test string (such as a binary data sequence 104a shown in FIG. 1). Here, the simulation signal data 510 may be numerical data, including a value corresponding to each point in the test waveform signal 530. The test waveform signal 530 may be substantially an analog waveform signal.

The testing device 400 includes a signal input terminal 410, a signal conversion circuit 430, a chip slot 450, and a processor 470 which are connected electrically in sequence.

The signal input terminal 410 is configured to receive the test waveform signal 530. The chip slot 450 is configured to receive a decoding chip, so that pins of the decoding chip can extend through the chip slot 450 to be coupled to other circuit elements. The signal conversion circuit 430 includes at least one transformer 431. A primary side of each transformer 431 is connected electrically to the signal input terminal 410, and a secondary side of each transformer 431 is connected electrically to the chip slot 450. Each transformer 431 is configured to convert the test waveform signal 530 into a pseudo track signal 550. That is to say, the test waveform signal 530 is coupled to the secondary side through the primary side of the transformer 431, so as to generate the pseudo track signal 550.

Figure 2:
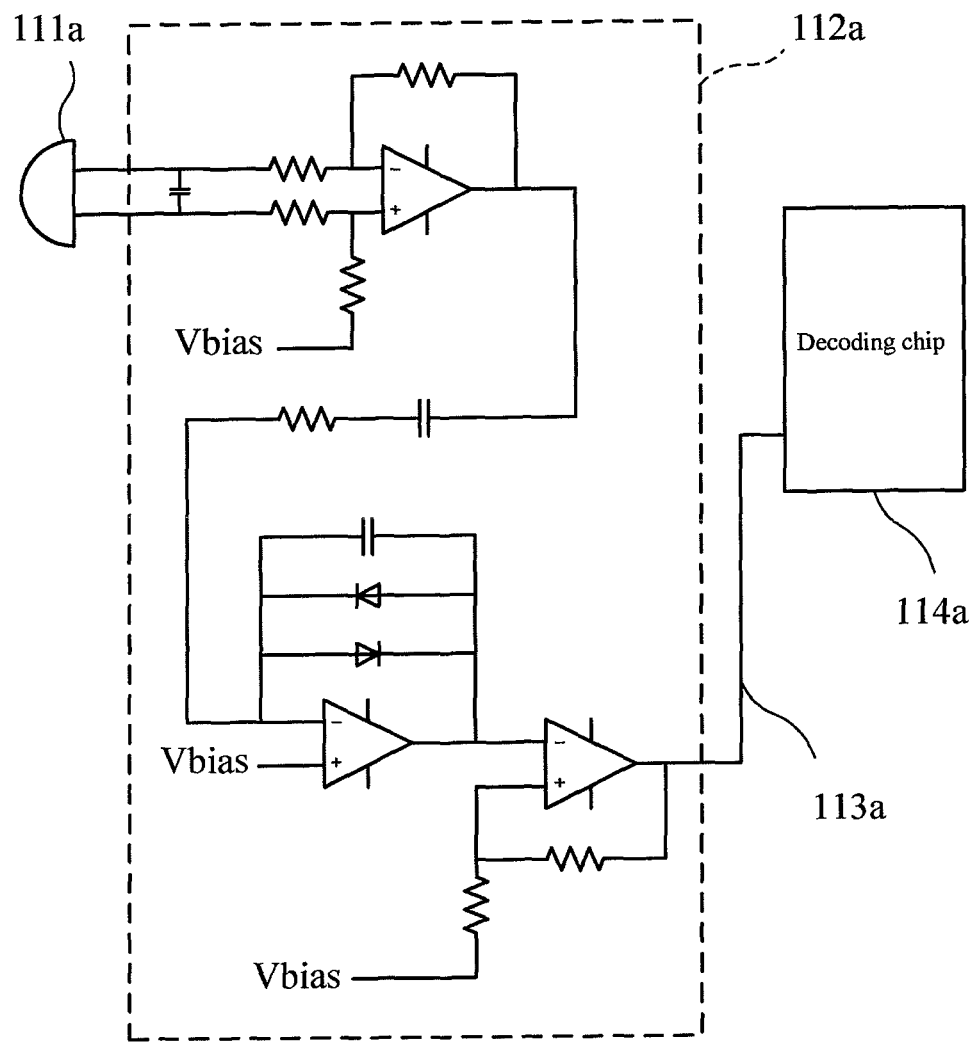
FIG. 2 is a schematic view of a magnetic stripe reading circuit 110a in the prior art.

Here, the transformer 431 is configured to simulate a swipe action and read a magnetic head. A magnetic head of a magnetic stripe reading circuit in the prior art outputs a signal read by the magnetic head to a signal processing circuit outside the decoding chip (as shown in FIG. 2), in a manner of feeding a differential signal. Alternatively, the signal processing circuit may be integrated inside the decoding chip, so that the decoding chip directly receives the differential signal read by the magnetic head. Therefore, in this embodiment, through the signal coupling of the transformer 431, the test waveform signal 530 may be coupled to a differential signal line connected to the decoding chip (that is, the pseudo track signal 550).

The pseudo track signal 550 is a single-track signal generated after simulating a magnetic stripe reading action of the magnetic head. Taking a magnetic stripe with three tracks recorded therein as an example, after the magnetic head reads the magnetic stripe, three track signals are generated, and the track signals respectively correspond to track information of each track. Consequently, the transformers 431 of this embodiment respectively read a single track by simulating the magnetic head, and correspondingly generate the pseudo track signal 550 of each track.

The decoding chip, after receiving the pseudo track signal 550 of each track, decodes each pseudo track signal 550 and respectively generates a corresponding decoded string 570, and the processor 470 receives the decoded string 570. One of the host 200 and the processor 470 compares the decoded strings 570 with a test string, so as to judge a decoding function of the decoding chip. For example, the host 200 may transfer the test string corresponding to the simulation signal data 510 to the processor 470, so that the processor 470 compares the decoded strings 570 with the test string. Alternatively, the processor 470 may transfer a decoding result (that is, the decoded strings 570), of the decoding chip to the host 200, so that the host compares the decoded strings 570 with the test string.

Figure 4:
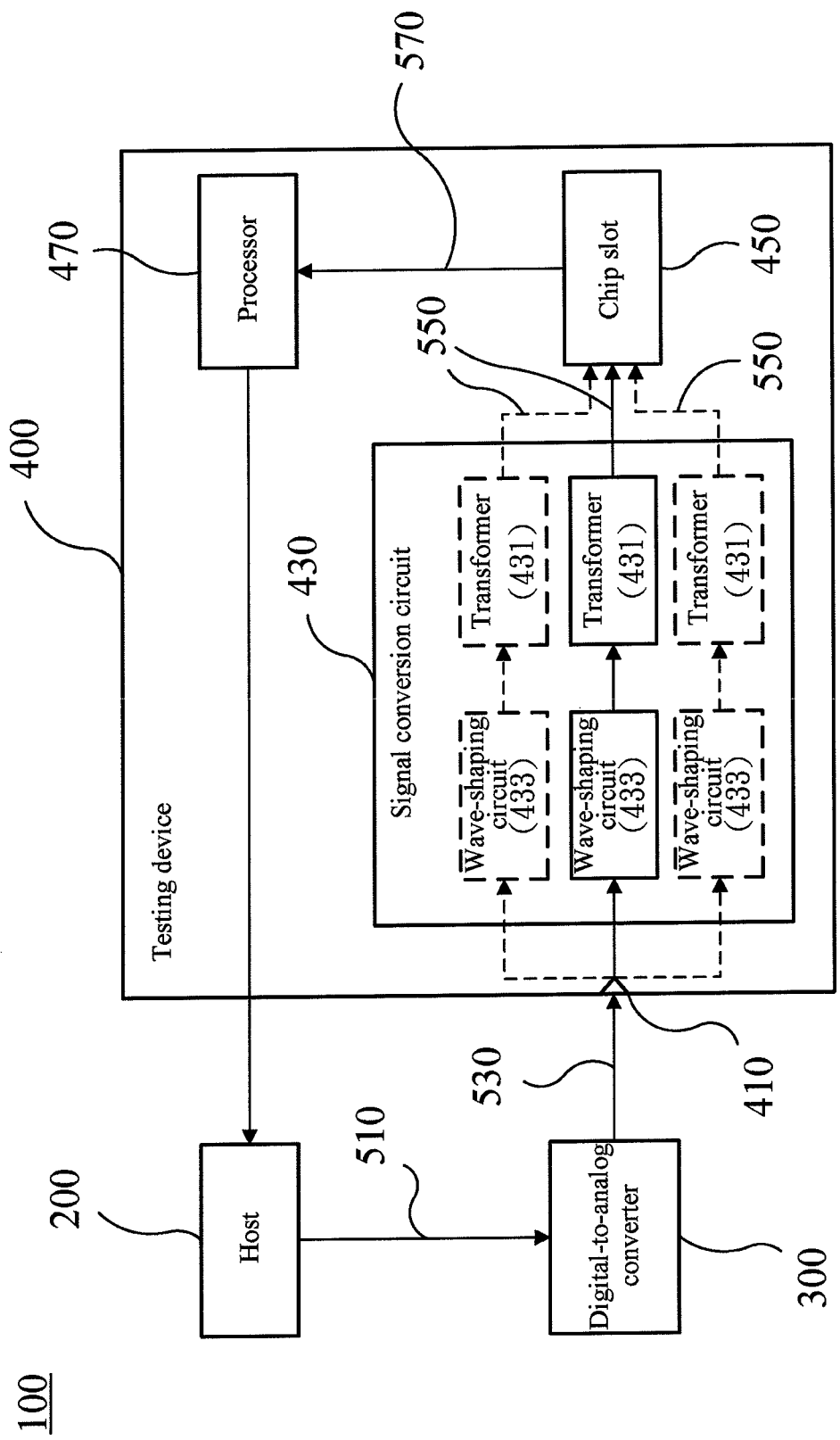
FIG. 4 is a block diagram of a testing system according to another embodiment of the present invention.

FIG. 4 is a block diagram of a testing system 100 according to another embodiment of the present invention. As shown in FIG. 4 which is basically the same as FIG. 3, the signal converter circuit 430 further includes wave-shaping circuits 433.

The wave-shaping circuits 433 are set corresponding to the transformers 431. Each wave-shaping circuit 433 is connected electrically between the primary side of the transformer 431 and the signal input terminal 410, and configured to adjust a waveform parameter of the test waveform signal 530. Here, the waveform parameter may be an amplitude, a signal-to-noise ratio, an amplitude jitter or a combination thereof.

The host 200 can store a plurality of batches of simulation signal data 510 for generating the test waveform signals 530 corresponding to different swipe speeds (IPS, inches per second), and magnetic recording densities. Here, the same simulation signal data 510 may corresponding to signals with different swipe speeds due to the difference between the magnetic recording densities of tracks.

Taking a magnetic stripe of three tracks as an example, the magnetic recording density of a first track and a third track is 210 BPI (bits per inch), and the magnetic recording density of a second track is 75 BPI. Therefore, if a signal with a swipe speed of 20 IPS is adopted for the first track and the third track, it is equivalent to inputting a signal with a swipe speed of 60 IPS for the second track.

Therefore, the selective output of the simulation signal data 510 set on the host 200 may control the pseudo track signal 550 to simulate a signal generated according to which magnetic recording density and swipe speed, or simulate a signal generated by reading a magnetic stripe using which type of encoding for recording.

In addition, with the wave-shaping circuit 433 for adjusting the test waveform signal 530, various signal forms that may be generated by different swipe actions can be simulated. For example, signals generated by reading the magnetic stripe moving at different speeds are simulated. When the magnetic stripe is moved at a low speed, a peak value of a signal generated after reading the magnetic stripe by the magnetic head is lower than that of a signal generated at a high moving speed. Furthermore, through noise coupling, it may be simulated that a signal generated after reading the magnetic stripe by a real magnetic head has some noise and amplitude jitter due to factors such as vibration or external signal interference.

Figure 5:
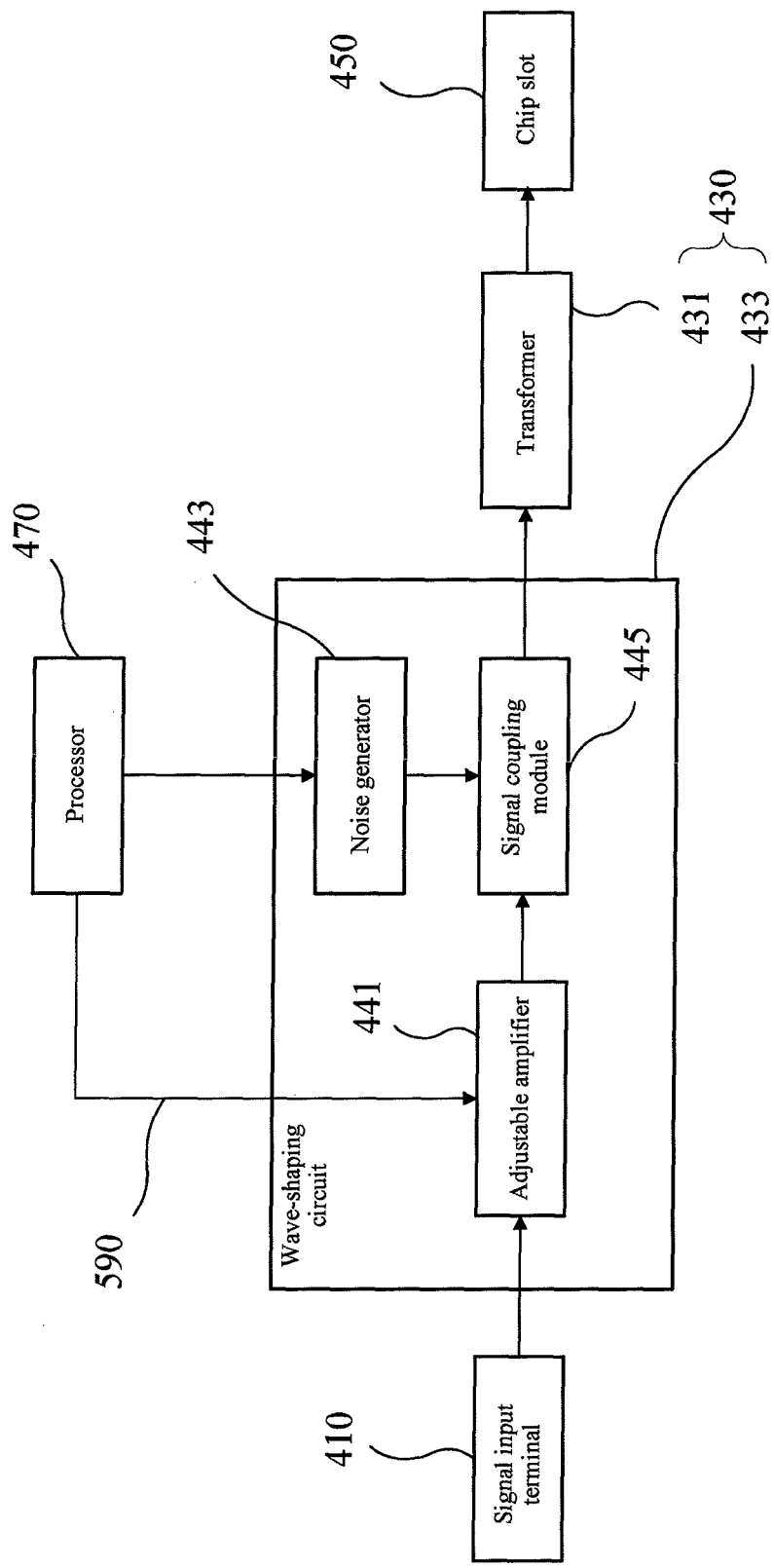
FIG. 5 is a block diagram of a wave-shaping circuit according to an embodiment of the present invention.

FIG. 5 is a block diagram of a wave-shaping circuit 433 according to an embodiment of the present invention. As shown in FIG. 5, the wave-shaping circuit 433 may include an adjustable amplifier 441, a noise generator 443, and a signal coupling module 445.

The adjustable amplifier 441 is connected electrically between the primary side of the corresponding transformer 431 and the signal input terminal 410, and configured to receive the test waveform signal 530, and adjust a gain of the adjustable amplifier 441 according to an amplification control signal 590 output by the processor 470. Here, the gain may be greater than 1 or smaller than 1. That is, the adjustable amplifier 441 may be configured to amplify or reduce the amplitude of the test waveform signal 530. The adjustable amplifier 441 may be implemented through an operational amplifier, in combination with a switch for switching resistors with different resistances which are connected to the operational amplifier, so as to change the gain of the adjustable amplifier 441.

The noise generator 443 is connected electrically to the processor 470, and controlled by the processor 470 to generate or not generate noise. The noise generated by the noise generator 443 may be coupled to the test waveform signal 530 through the signal coupling module 445. Here, the signal coupling module 445 may be implemented through a capacitor coupler, an inductive coupler, or an adder.

Here, the wave-shaping circuit 433 may not include the noise generator 443 and the signal coupling module 445. In the simulation signal data 510 output by the host 200, a simulation signal with noise and amplitude jitter is recorded. Alternatively, the digital-to-analog converter 300 adds an interfering signal, making the pseudo track signal 550 output by the digital-to-analog converter 300 include noise and amplitude jitter. Therefore, the interference resistance (tolerance), of the decoding chip can be tested through the pseudo track signal 550 with noise and amplitude jitter.

Similarly, the wave-shaping circuit 443 also may not include the adjustable amplifier 441, in which case the digital-to-analog converter 300 is used to adjust the amplitude of the pseudo track signal 550.

As shown in FIG. 5, the processor 470 may be connected electrically to the wave-shaping circuit 433 to control the wave-shaping circuit 433 to set the waveform parameter (control the gain and whether to couple the noise).

In an embodiment, the adjustable amplifier 441 may change the gain of the test waveform signal 530 with time according to the change of the amplification control signal 590. That is, for the test waveform signal 530 in which all peak values are the same, the peak values may be changed through the adjustable amplifier 441, so that the peak values are different from one another. Therefore, it may be tested in one test waveform signal 530 in order to determine whether the decoding chip can correctly decode the signal with different peak values.

In an embodiment, the number of tracks capable of being decoded by the decoding chip should be smaller than or equal to the number of transformers. For example, if the testing system 100 of this embodiment may be used to test a decoding chip capable of decoding three tracks, the signal conversion circuit 430 includes three transformers 431 and three wave-shaping circuits 433 to correspondingly generate three pseudo track signals 550 respectively. However, for a decoding chip for testing a single track, the signal conversion circuit 430 also may include three transformers 431 and three wave-shaping circuits 433, but only one pair of the transformer 431 and the wave-shaping circuit 433 outputs the pseudo track signal 550 to the chip slot. That is to say, the signal conversion circuit 430 may include a switch controlled by the processor 470 to control each pair of the transformer 431 and the wave-shaping circuit 433 to output or not output the pseudo track signal 550.

In an embodiment, the testing device 400 may include a plurality of signal conversion circuits 430 and corresponding chip slots 450 grouped in pairs, so as to test a plurality of decoding chips at the same time.

Figure 6:
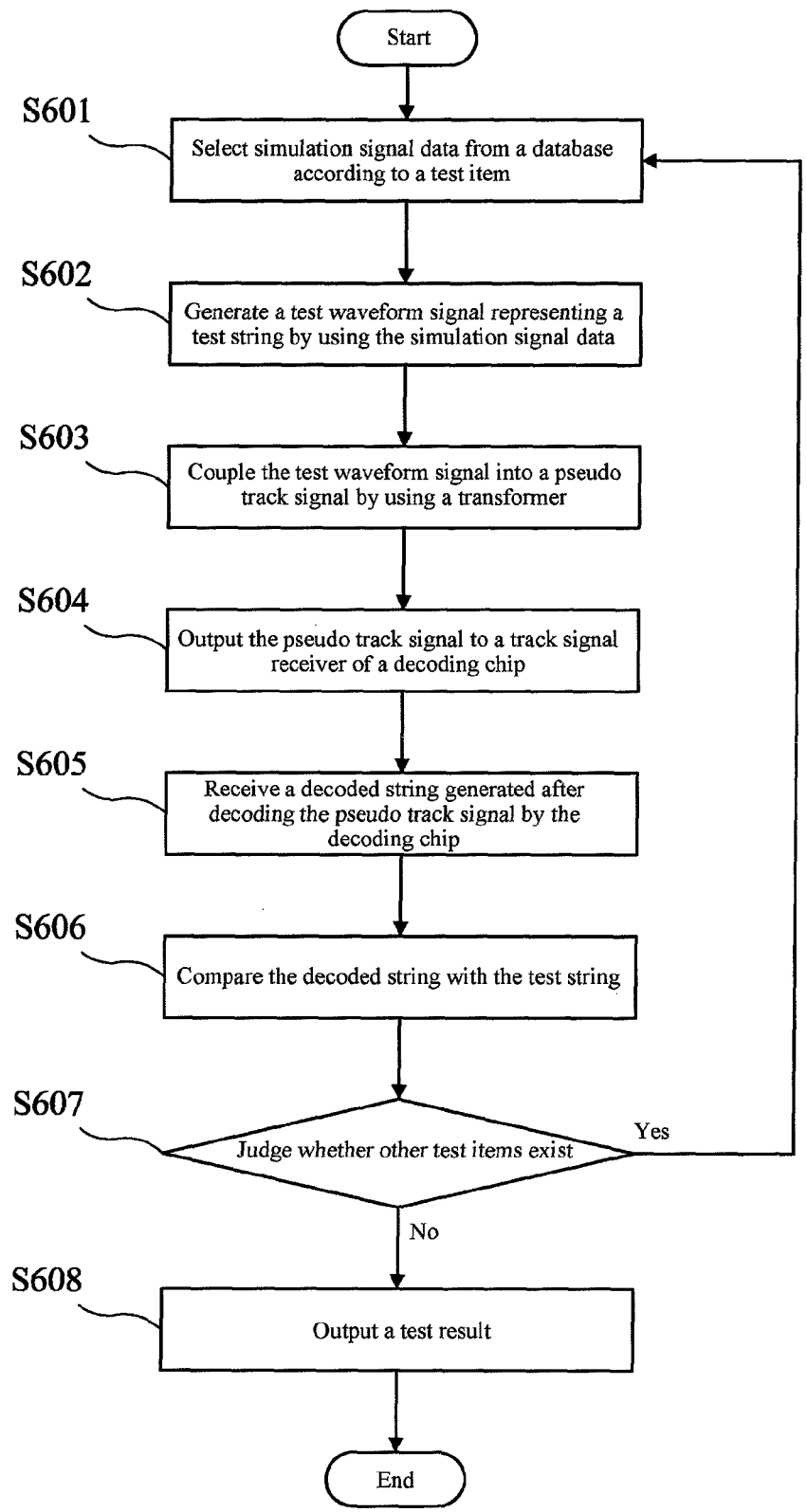
FIG. 6 is a flow chart of a testing method according to an embodiment of the present invention.

FIG. 6 is a flow chart of a testing method according to an embodiment of the present invention. As shown in FIG. 6, first, simulation signal data 510 is selected from a database according to a test item (Step S601).

Here, each test item may be a specific combination of the waveform parameters. For example, a test item may be to enable the pseudo track signal 550 received by the decoding chip to be equivalent to a signal with a swipe speed of 5 IPS (inches per second), an amplitude of 60% to 100% of the test waveform signal 530, 10% probability for noise and a maximum voltage value of 3 volts. Through many pseudo track signals 550 generated according to different combinations of waveform parameters, the decoding function of the decoding chip can be comprehensively tested.

Next, a test waveform signal 530 representing a test string is generated by using the simulation signal data 510 (Step S602).

In Step S602, the simulation signal data 510 may be converted into the test waveform signal 530 by using a digital-to-analog conversion technique.

Afterwards, the test waveform signal 530 is coupled into a pseudo track signal 550 by using a transformer 431 (Step S603). Further, the pseudo track signal 550 is output to a track signal receiver of the decoding chip (Step S604).

Here, the transformer 431 may simulate a magnetic head, and accordingly the pseudo track signal 550 may simulate a signal obtained after reading a track by the magnetic head.

The decoding chip, after receiving the pseudo track signal 550, decodes the pseudo track signal 550 to generate a decoded string. After the decoded string is received, the decoded string is compared with the test string (Step S605 and Step S606). Therefore, it can be learned whether the decoding chip correctly decodes the information carried by the pseudo track signal 550 in this test.

Next, it is determined whether other test items exist (Step S607). If there are still other test items to be tested, the process returns to Step S601 to select another batch of simulation signal data 510 according to another waveform parameter combination, followed by subsequent steps; otherwise, if no other test items exist, a test result is output (Step S608).

In Step S608, the output test result is an overall result of tests using each simulation signal data 510 (if a plurality of batches of simulation signal data 510 is used for testing), is tested. That is, in a plurality of test items, if any test result shows that the decoding chip is abnormal, the test result finally output in Step S608 is abnormal. In other words, only when the results of all the test items are normal, is the test result output in Step S608 normal.

In an embodiment, between Step S602 and Step S603, a step of adjusting an amplitude of the test waveform signal 530 is further included. Here, this step may be used to determine the amplitude of the pseudo track signal 550, while in Step S601, this step may be used to determine the frequency of the pseudo track signal 550 (corresponding to a combination of magnetic recording density and swipe speed).

In an embodiment, between Step S602 and Step S603, a step of coupling an interfering signal to the test waveform signal is further included. Therefore, it may be simulated that due to factors such as vibration, the signal generated after reading the magnetic stripe by a real magnetic head has some noise and amplitude jitter.

In other words, to enable the pseudo track signal 550 to have noise or amplitude jitter, the test waveform signal 530 with noise or amplitude jitter may be directly generated in Step S601, or an interfering signal may be coupled to the test waveform signal 530 before Step S603. Similarly, the amplitude of the pseudo track signal 550 may also be changed in the same step (in Step S601 or before Step S603).

Accordingly, in the embodiments of the present invention, a test waveform may be customized to comprehensively test the decoding chip, which can provide a stable, accurate, and multifaceted test compared with the test requiring manual swiping in the prior art. In addition, since the test waveform is directly provided for the decoding chip, and a plurality of decoding chips can be tested at the same time, the testing time can be reduced.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A system for testing a magnetic stripe decoding chip, the system comprising:
   a host, configured to output simulation signal data and to store a plurality of batches of simulation signal data for generating the test waveform signal corresponding to different swipe speeds and magnetic recording densities;
   a digital-to-analog converter, connected electrically to the host, and configured to receive the simulation signal data and output a test waveform signal representing a test string; and
   a testing device, connected electrically between the host and the digital-to-analog converter, comprising:
   a signal input terminal, configured to receive the test waveform signal;
   a chip slot, configured to receive a magnetic stripe decoding chip;
   a signal conversion circuit, connected electrically to the chip slot, and comprising at least one transformer, wherein a primary side of each transformer is connected electrically to the signal input terminal, a secondary side of each transformer is connected electrically to the chip slot, and each transformer is configured to convert the test waveform signal into a pseudo track signal; and
   a processor, connected electrically to the chip slot and the host, and configured to receive at least one decoded string respectively generated after decoding the at least one pseudo track signal by the magnetic stripe decoding chip, wherein one of the host and the processor compares the at least one decoded string with the test string, the comparing thereby testing the decoding and operating parameters of the magnetic stripe decoder chip without relative motion between a magnetic stripe card comprising the magnetic stripe decoding chip and a corresponding reader.

2. The testing system according to claim 1, wherein the signal conversion circuit further comprises a wave-shaping circuit, respectively corresponding to the at least one transformer, connected electrically between the primary side of the corresponding transformer and the signal input terminal, and configured to adjust a waveform parameter of the test waveform signal, wherein the waveform parameter is selected from a group consisting of an amplitude, a signal-to-noise ratio, an amplitude jitter, and a combination thereof.

3. The testing system according to claim 2, wherein the processor is connected electrically to the wave-shaping circuit and configured to control the wave-shaping circuit to set the waveform parameter.

4. The testing system according to claim 3, wherein the wave-shaping circuit comprises:
   an adjustable amplifier, connected electrically between the primary side of the corresponding transformer and the signal input terminal, and configured to receive the test waveform signal, and adjust a gain of the adjustable amplifier according to an amplification control signal output by the processor.

5. The testing system according to claim 4, wherein the adjustable amplifier changes a gain of the test waveform signal with time according to a change of the amplification control signal.

6. The testing system according to claim 1, wherein the number of the at least one transformer is multiple, and the number of tracks capable of being decoded by the decoding chip is smaller than or equal to the number of transformers.

7. A method for testing a magnetic stripe decoding chip, for inspecting a decoding chip, the testing method comprising:
   selecting simulation signal data from a database according to a test item;
   generating a test waveform signal representing a test string by using the simulation signal data;
   coupling an interfering signal to the test waveform signal;
   coupling the test waveform signal into a pseudo track signal by using a transformer;
   outputting the pseudo track signal to a track signal receiver of the decoding chip;
   receiving a decoded string generated after decoding the pseudo track signal by the decoding chip;
   comparing the decoded string with the test string; and
   judging whether other test items exist, and if other test items exist, repeating the method until no other test items exist, and when no other test items exist, outputting a test result of the result of the operational parameters of the magnetic stripe decoder chip without relative motion between a magnetic stripe card comprising the magnetic stripe decoder chip and a corresponding reader.

8. The testing method according to claim 7, further comprising:
   adjusting an amplitude of the test waveform signal, before the step of coupling the test waveform signal into a pseudo track signal by using a transformer.

* * * * *